United States Patent
Burnette

(10) Patent No.: US 11,425,218 B1
(45) Date of Patent: Aug. 23, 2022

(54) COMPONENT STATE MANAGEMENT FOR WEB APPLICATION DEVELOPMENT

(71) Applicant: Shipt, Inc., Birmingham, AL (US)

(72) Inventor: Chace Burnette, Birmingham, AL (US)

(73) Assignee: Shipt, Inc., Birmingham, AL (US)

( * ) Notice: Subject to any disclaimer, the term of this patent is extended or adjusted under 35 U.S.C. 154(b) by 0 days.

(21) Appl. No.: 17/187,315

(22) Filed: Feb. 26, 2021

(51) Int. Cl.
*G06F 9/44* (2018.01)
*H04L 67/00* (2022.01)
*G06F 16/958* (2019.01)
*G06F 8/36* (2018.01)
*G06F 8/34* (2018.01)
*G06F 8/20* (2018.01)
*G06F 9/445* (2018.01)
*H04L 41/08* (2022.01)

(52) U.S. Cl.
CPC .............. *H04L 67/34* (2013.01); *G06F 8/20* (2013.01); *G06F 8/34* (2013.01); *G06F 8/36* (2013.01); *G06F 9/445* (2013.01); *G06F 16/958* (2019.01); *H04L 41/08* (2013.01)

(58) Field of Classification Search
CPC ..... G06F 8/20; G06F 8/34; G06F 8/36; G06F 16/958; H04L 67/34
See application file for complete search history.

(56) References Cited

U.S. PATENT DOCUMENTS

| 10,203,937 | B1 * | 2/2019 | Azaroff | ..................... G06F 8/34 |
| 2003/0191803 | A1 * | 10/2003 | Chinnici | ................. H04L 67/34 709/203 |
| 2007/0100967 | A1 * | 5/2007 | Smith | ....................... G06F 8/20 709/219 |

OTHER PUBLICATIONS

React—A JavaScript library for building user interfaces—Get Started; Dec. 3, 2020; 5 Pages; United States.
Redux—A Pridictable State Container for JavaScript Apps—Get Started; Dec. 3, 2020; 3 Pages; United States.
Mateusz & Adrian; React Component lifecycle: React lifecycle methods & hooks; Mar. 20, 2020; 5 Pages; United States.
GitHub—jamiebuilds/unstated-next 200 bytes to never think about React state management libraries ever again Dec. 4, 2020; 14 Pages; United States.
GitHub—donavon/use-persisted-state: A custom React Hook that provides a multi-instance, multi-tab/browser shared and persistent state; Dec. 4, 2020; 4 Pages; United States.
Selbekk; Persisting your React state in 9 lines—DEV; Originally Published May 7, 2019; 9 Pages; United States.
React-persist-hook—npm (Learn about our RFC process, Open RFC meetings & more—Join in the discussion!) https://www.npmjs.com/package/react-persist-hook; Dec. 4, 2020; 5 Pages; United States.
How to create global state using React hooks in Typescript—Naina Codes; Dec. 4, 2020; 13 Pages; United States.

* cited by examiner

*Primary Examiner* — Tuan A Vu

(74) *Attorney, Agent, or Firm* — Merchant & Gould P.C.

(57) ABSTRACT

A library may be provided that is useable in conjunction with a front-end user interface component management framework. The library may include one or more functions that provide custom hooks that allow a developer to expose state information outside of the front-end user interface component management framework, for example, to other aspects of a web application that uses such a framework. Hooks within the library may allow a developer to persist state of components for global use as well.

20 Claims, 9 Drawing Sheets

COMPONENT STATE MANAGEMENT FOR WEB APPLICATION DEVELOPMENT

BACKGROUND

In the context of mobile and web application development, an open source library, ReactJS (also referred to as "React"), has been developed to assist with building user interfaces from discrete elements. These discrete elements include, for example, elements (which are plain objects), and components (separate, reusable pieces). Complex user interfaces may be built from the isolated pieces of code called components.

Within the React framework, components are organized in a hierarchical/tree structure, and each component may have a variety of states. Each component may change state due to user interaction with the web application. However, state management is not, of itself, managed within React. Also, because states are managed within each component itself, and because lower level components inherit from higher level components but not other unrelated/lower level components, it is often the case that state information of one component is inaccessible from other components for which that state information may be useful.

In response to some of these issues, a library called React Redux (or "Redux") has been developed that manages state information within the React framework. Redux maintains a monolithic state store which may be accessed from other components within the React framework. However, Redux requires a separate set of programming conventions, and only provides state information to other components within the React framework—other application components that may not fall within the React framework would then not have access to state information.

Recently, React has been enhanced with the addition of "hooks", which are generally functions that allow developers to view state and lifecycle features from function components. Hooks are not useable within classes, but instead allow a developer to use React without use of classes. There are a few existing hooks built by default into react, such as use of a state or context. However, as with Redux, existing hooks are limited to accessing state information from within the React framework across, e.g., function components.

Nevertheless, there remains a need to use the convenient structure of React, while exposing state information from React components in a manner that allows a user to flexibly retrieve such state information from anywhere within the web application, regardless of whether within the React component tree. Additionally, states of react components may be desired to be persisted for reuse either within the React component tree or elsewhere. Accordingly, improvements in accessibility of state information in the context of a web application development component management framework are desired.

SUMMARY

In general terms, the present disclosure relates to methods of managing state information globally in conjunction with use of a front-end user interface component management framework. By making state information globally accessible, complex interdependencies may be used, and application updates may be provided more flexibly based on changes to user interface component states.

In a first aspect, a method includes, during initial configuration of a web application managed using a front-end user interface component management framework, importing a function from a library through which state information is accessible globally within an execution environment. Importing the function provides a hook to state information storage, the state information being descriptive of a state of a component within the front-end user interface component management framework. The method includes receiving, returned by function: a context variable providing access to the state and functions needed to operate on the state; a higher order component that provides access to the state information storage to the web application; and an object providing a container reference, the container reference providing access to state variables and functions. The method further includes importing a state access function and providing information from the higher order component and a root of the web application to the state access function. The method also includes receiving, in response to calling the state access function, the root of the web application wrapped within a state container context at code external to the component.

In a second aspect, a system includes a library called by a web application executed from a user computing device. The web application is managed using a front-end user interface component management framework, and includes a plurality of components associated with user interface elements. The library includes a function providing a hook to state information storage. The function returns, when called: a context variable providing access to the state and functions needed to operate on a state of a component from among the plurality of components; a higher order component that provides access to the state information storage to the web application; and an object providing a container reference, the container reference providing access to state variables and functions. When called by a portion of the web application external to the component, a state access function included within the library returns a root of the web application wrapped within a state container context to allow access to the state of the component.

In a third aspect, a computer-implemented method of performing global state management useable in connection with a web application executed from a user computing device, the web application being managed using a front-end user interface component management framework is disclosed. The method includes, during initial configuration of the web application, importing a function from a global state management library, wherein the function provides a hook to state information storage, the state information being descriptive of a state of a component within the front-end user interface component management framework. The method further includes receiving, in response to calling the function: a context variable providing access to the state and functions needed to operate on the state; a higher order component that provides access to the state information storage to the web application; and an object providing a container reference, the container reference providing access to state variables and functions. The method also includes importing a state access function, and providing information from the higher order component and a root of the web application to the state access function. The method includes receiving, in response to calling the state access function, the root of the web application wrapped within a state container context. The method also includes accessing a state of the component from code external to the component using the root of the web application wrapped within the state container context.

BRIEF DESCRIPTION OF THE DRAWINGS

The same number represents the same element or same type of element in all drawings.

DETAILED DESCRIPTION

As briefly described above, embodiments of the present invention are directed to methods of managing state information globally in conjunction with use of a front-end user interface component management framework. By making state information globally accessible, complex interdependencies may be used, and application updates may be provided more flexibly based on changes to user interface component states.

In some example embodiments, a library may be provided that is useable in conjunction with a front-end user interface component management framework. The library may provide one or more functions that expose custom hooks that allow a developer to expose state information outside of the front-end user interface component management framework, for example, to other aspects of a web application that uses such a framework.

By exposing state information external to the framework, the library and methods described herein allow for improved flexibility with respect to how component state information is shared among elements which traditionally would have been managed using a strict hierarchy of such a framework. Additionally, by use of custom hooks and instantiated storage per component for which state is desired to be exposed, a number of smaller state stores are provided which are each accessible external to the framework but implemented within the programming rules of the framework. Therefore, no third party libraries are required, and no other state management implementations are needed that typically require use of a monolithic state storage using a unique programming construct different from that of the framework, and which still do not expose system state externally to that framework. Further, providing a container reference in response to calling the custom hook allows for the state information to be easily exposed external to the environment of the framework because the container reference may wrap a reference to a top level of the web application, thereby exposing state information globally.

Figure 1:
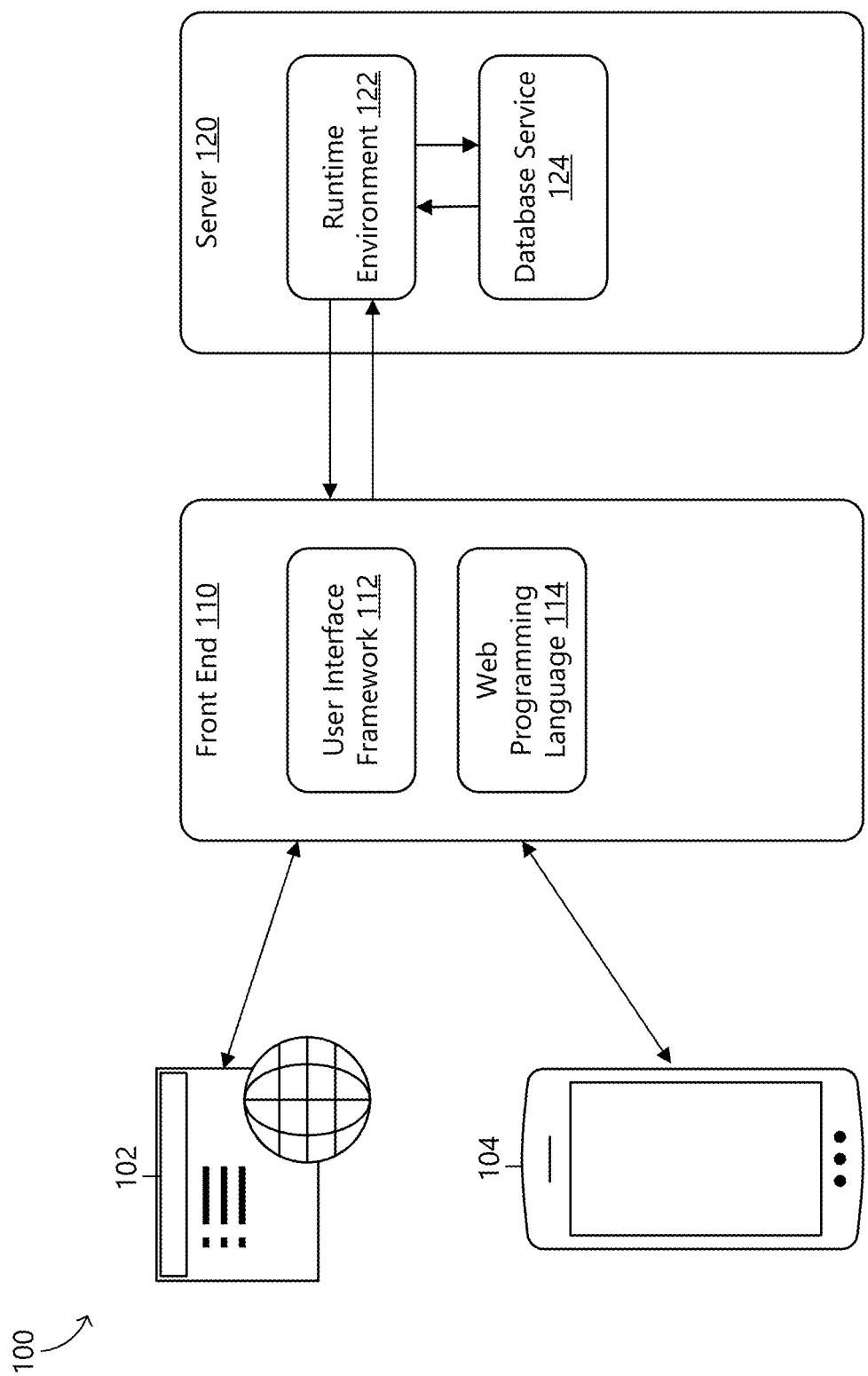
FIG. 1 illustrates an example web application execution environment in which aspects of the present disclosure may be implemented.

FIG. 1 illustrates an example web application execution environment 100 in which aspects of the present disclosure may be implemented. In the example shown the web application execution environment 100 exposes a web application to any of a variety of user devices, such as via a web browser 102 or a mobile application executable on a mobile device 104. In example embodiments, the web application comprises an application having a plurality of interactive, discrete user interface features, of which interaction with one such feature may affect interactions with or display of other features. Details regarding an example application that may be presented on devices 102, 104 are provided below.

In the example shown, a front end 110 hosts executable code 112 written in a web programming and execution language, such as JavaScript. A user interface framework 114 is also executable at the front-end and defines a structure within which the executable code 112 may be executed at the front end 110. For example, the user interface framework may be implemented using React.JS or analogous functionality. In particular, the user interface framework provides self-contained, modularized user interface components that are independently able to be executed/refreshed to allow less than an entire user interface to be refreshed when changes occur, thereby improving client-side execution efficiencies. In such instances, modules, or components, of the user interface are arranged in a tree structure from a top-level application node down through dependent user interface elements which may include, for example, business logic, graphical appearance definition, or other features.

In example embodiments, the front end 110 comprises a portion of a web application that resides at devices 102, 104 (e.g., embodied in a mobile application or executable within a web browser of a computing device). In other embodiments, portions of the front end 110 may be executable at a server and provided to a client device (e.g., devices 102, 104).

In the example shown, the front end 110 is interfaced to a server 120, which provides a runtime environment 122 and a database service 124. The runtime environment 122 may be implemented using a back-end runtime environment that executes compatible code to the executable code 112 at a server. In some example embodiments, the runtime environment 122 may correspond to a Node.js runtime environment; however, a variety of other types of runtime environments may be provided as well. The database service 124 provides data to the web application, and may vary widely depending on the particular features and functionality to which the web application is directed. In the context of an electronic commerce website, the database service 124 may provide, for example, a product selection; inventory data, sales and/or pricing data, images and text detail of products, or various other information. Of course, these types of data are merely exemplary.

Figure 2:
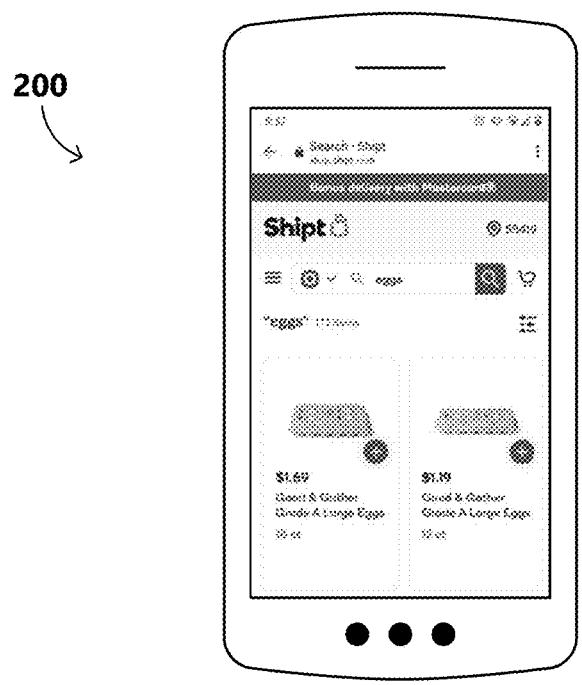
FIG. 2 illustrates a simplified example web application in which interactive elements may be managed using a front-end user interface component management framework.

FIG. 2 illustrates an example web application 200 in which interactive elements may be managed using a front-end user interface component management framework. In the example shown, the web application is executable on a mobile device, such as mobile device 104 of FIG. 1. However, the web application 200 may execute in a browser or on a variety of other types of devices, consistent with the present disclosure.

In the example shown, the web application 200 includes a number of interactive elements. For example, a listing of products available for purchase is presented, as well as prices and a particular retail location from which those products are sold. Additionally, a location is presented (in the form of a zip code). Each of these user interface elements may be interactive, in that a user may select a product from the selection of products to purchase, may select a drop-down menu indicating the currently-selected particular retail location, and/or may select the zip code to update location. While these different user interface elements may or may not be hierarchically defined within a front-end user interface component management framework, they may still affect how others of the user interface elements are displayed. For example, a change in a zip code may change a product selection that is offered for sale. A change of retail location may also change the product selection. Accordingly, in various instances, a state (or, more accurately a change of state) of one graphical element may, despite being unrelated to other elements, cause those other elements to need to be refreshed.

Figure 3:
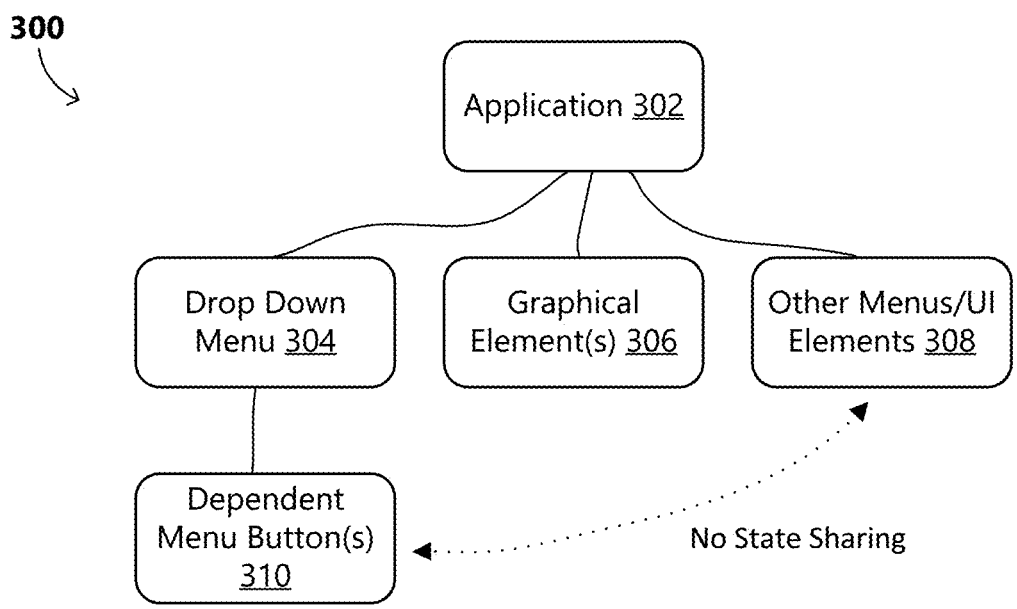
FIG. 3 illustrates an example component diagram managed using the front-end user interface component management framework.
Figure 4:
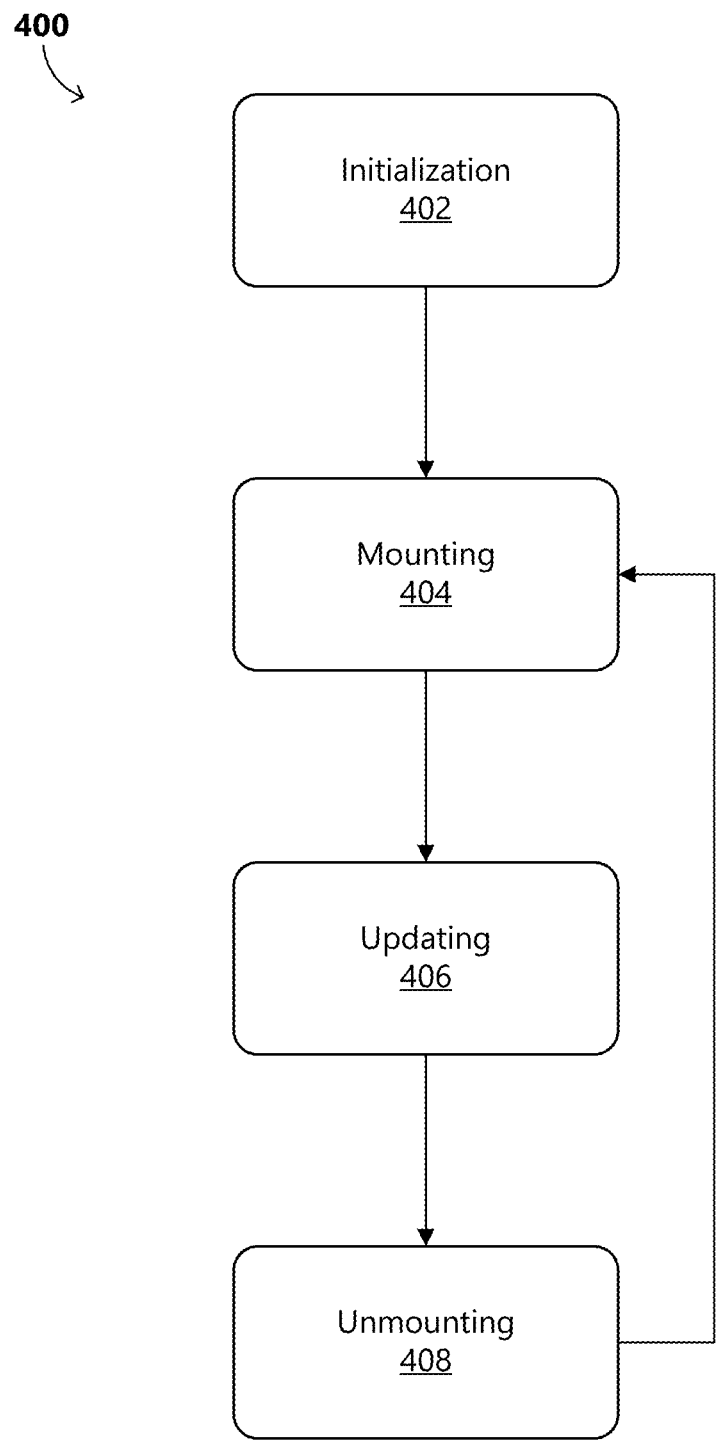
FIG. 4 illustrates an example set of state transitions that may be used by various components within the front-end user interface component management framework.

FIG. 3 illustrates an example component diagram 300 managed using the front-end user interface component management framework, which illustrates the difficulty of such refresh, either within a front-end user interface component management framework or external to it. In the example shown, a tree structure includes an application root node 302 which is connected to child nodes, such as a drop down menu component 304, other graphical components 306, and other menu or user interface components 308. Form the drop-down menu 304, there may be a set of dependent menu buttons 310 that appear based on selection of a particular option in the drop-down menu 304. In an example arrangement, the dependent menu buttons may also appear dependent on other user interface elements to which they are not related, or may cause a change of appearance of other user interface elements. However, because the menu button component 310 are not related to those other user interface element components 308, there is no convenient way within the front-end user interface component management framework to share state across those components. This is further exacerbated by the various states that a component may transition to/through. As seen in FIG. 4, a state transition diagram 400 indicates that after an initialized state 402, a particular component may be in any of a mounting state 404 (when the framework renders the component for a first time), an updating state 406 (where the component appearance is updated based on user select), or an unmounting state 406 (the component no longer being required, and ceasing to be maintained at the framework). Such state information, as well as current state variables within each of those states (e.g., the particular value of the zip code, retail organization, etc. displayed in FIG. 2) would be required to determine validity of the various states for use. Where components are not related within the framework, such state information sharing may be difficult across components, and may be entirely impossible to be shared outside the framework entirely. Additionally, in some instances, a component may be unmounted, but may need to be used again and therefore it may be useful to re-initialize a new component using the last-existing state for the previous version of that component.

Figure 5:
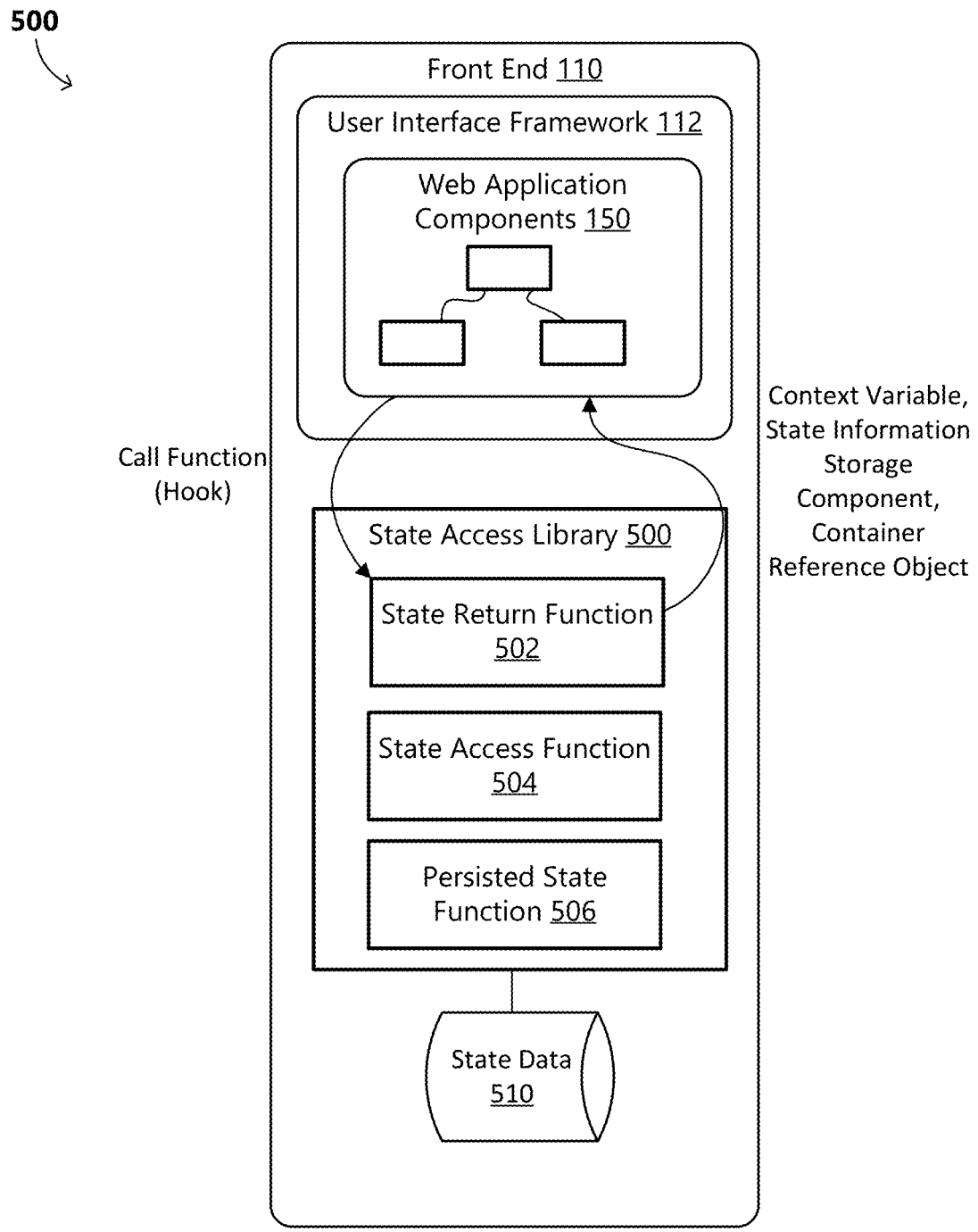
FIG. 5 illustrates a logical diagram of interactions between a front-end user interface component management framework and an example library in which state information may be managed globally for any object within the front-end user interface component management framework.
Figure 6:
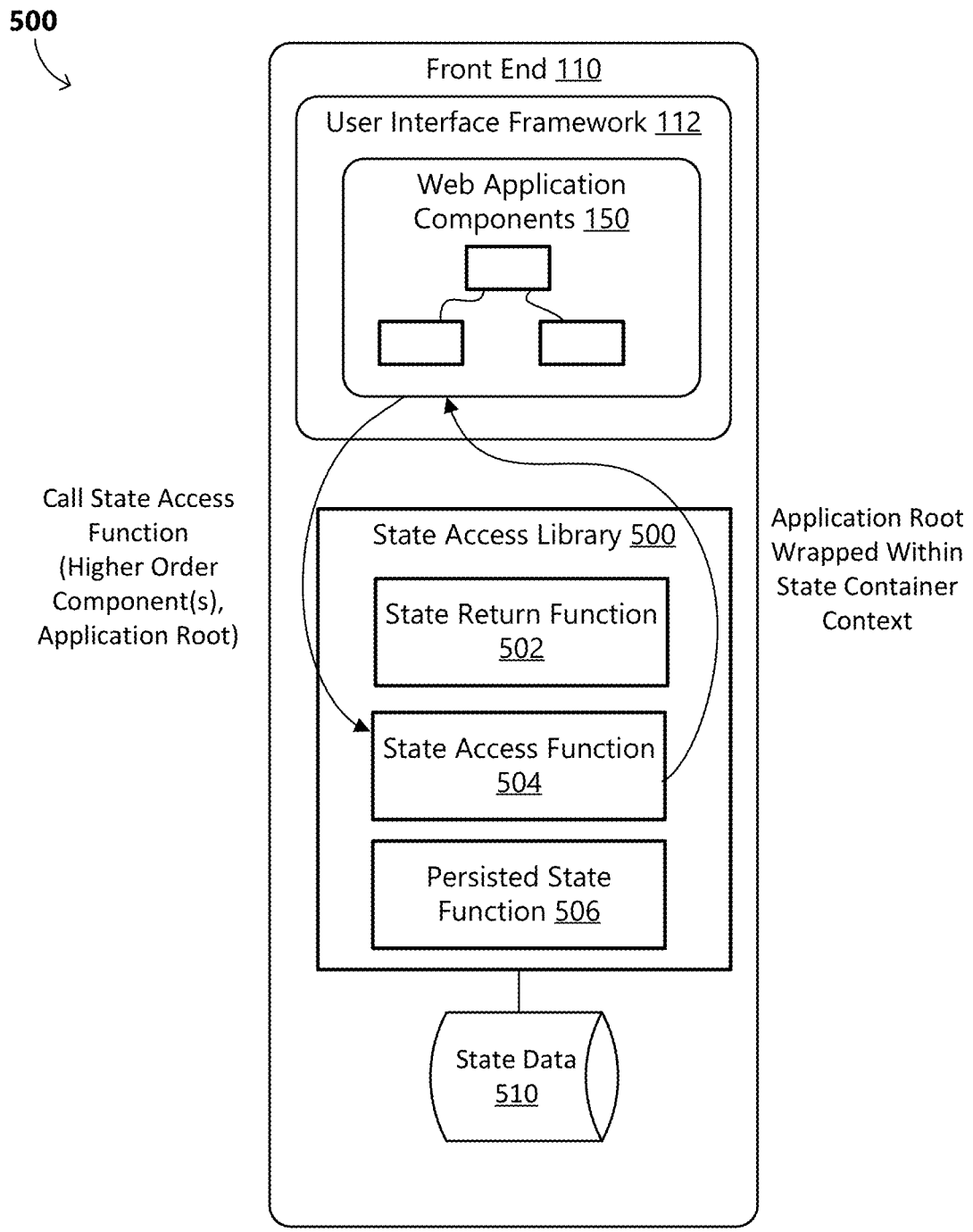
FIG. 6 illustrates a logical diagram of further interactions between a front-end user interface component management framework and an example library in which state information may be managed globally for any object within the front-end user interface component management framework.
Figure 7:
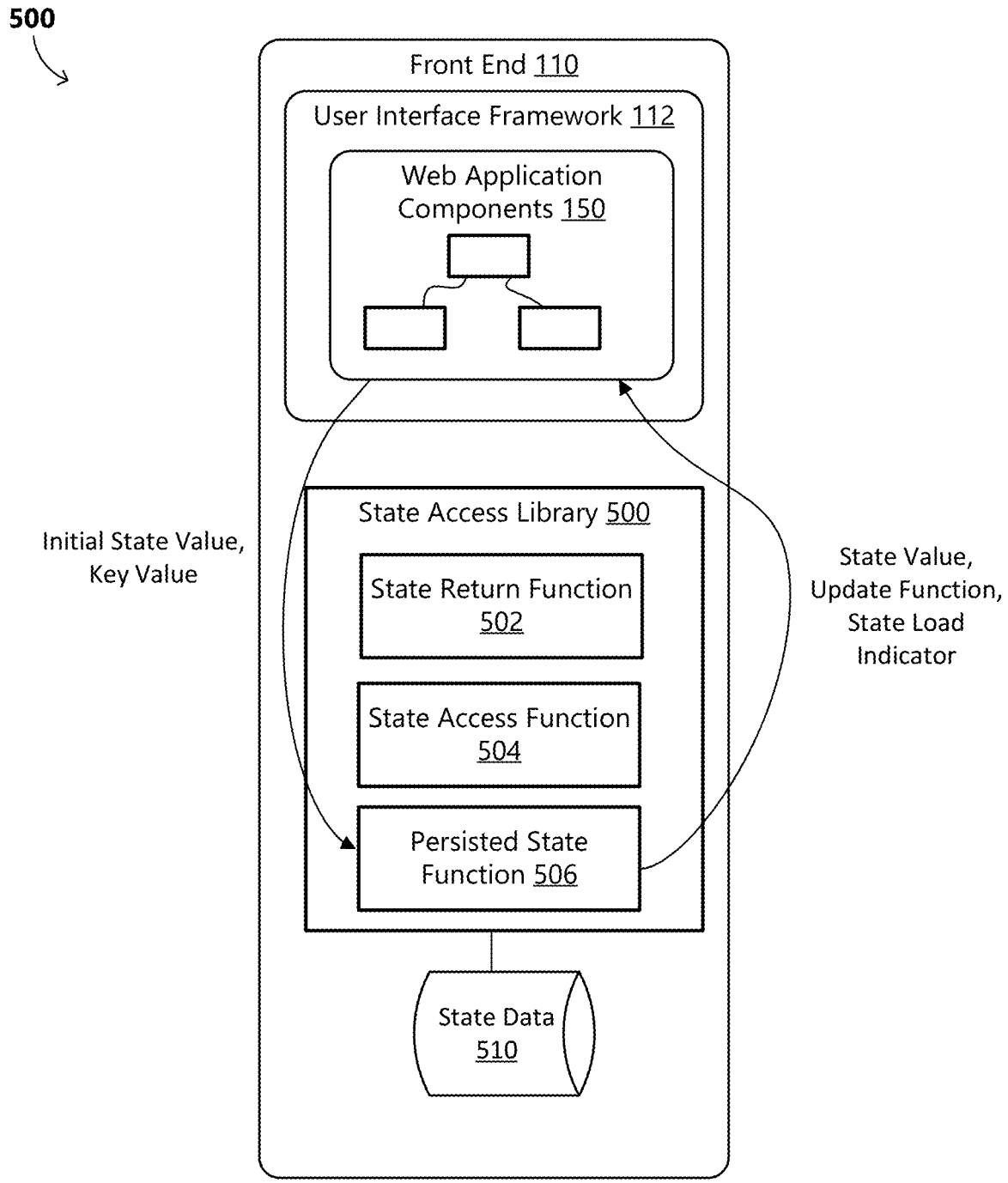
FIG. 7 illustrates a logical diagram of interactions between a front-end user interface component management framework and an example library in which state information may be persisted globally.

Referring now to FIGS. 5-7, example operations are shown that may be performed using a library that can be added to and used in conjunction with the front-end user interface component management framework described above. In particular, and as discussed below, the library uses hooks to return state information in a way that makes that information accessible globally, and in a manner that allows state persistence. Additional advantages are described below in conjunction with FIGS. 5-7, with a particular method of use described in FIG. 8 with code examples for the example scenario in which the library is used in combination with a React.JS framework.

FIG. 5 illustrates a logical diagram of interactions at a front end 110 between a front-end user interface component management framework 112 and an example library 500 in which state information may be managed globally for any object within the front-end user interface component management framework 112. The in the example shown, the framework 112 maintains a plurality of when the application components 150 within the context of the framework. To obtain state information, either from one of the web application components or from a portion of the web application entirely separate from the framework 112, a function may be called providing a name of a custom hook. The function may be, for example, a state return function 502 of a state access library 500. The function 502 can return to the calling code a context variable, a higher order component, and a container reference object. The context variable may, in some embodiments, provided access to a state and to functions needed to operate on that state. Additionally, the higher order component may provide access to a state information storage for the web application. Furthermore, the container reference object may provide access to state variables and functions.

In a particularized example in which the framework 112 corresponds to React.JS, the state return function that is called may be a setup function callable, for example, using an import function such as:

import {setupStore} from '@directory/directory';

When called, setupStore takes a single hook as an argument, and returns three variables, as follows:

let [containerContext, wrapperFunction, containerRef]
   =setupStore(useStateContainer);

In this call, containerContext is a context variable that gives access to state and functions. wrapperFunction is a higher order component used to provide the store to the web application and should be used to wrap the top level component in the web application. containerRef is an object that gives access to state variables and functions outside of the standard React component tree.

FIG. 6 illustrates a logical diagram of further interactions between a front-end user interface component management framework 112 and an example library 500 in which state information may be managed. The arrangement seen in FIG. 6 represents a manner of exposing state information using the variables returned as described above in conjunction with FIG. 5.

In particular, in the example shown in FIG. 6, a call may be made to a state access function 504, providing the higher order component previously obtained (e.g., the wrapper-Function, above), as well as an application root (i.e., the top level of the application tree structure formed within the framework 112). In response, the state access function 504 can return the application root wrapped within a state container context. This exposes the state information at a level above the components managed by the framework 112, and therefore allows state information from anywhere within the web application components 150 for which a higher order function is exposed externally to the framework 112.

Continuing the code example above, the state access function may be implemented using a store provider function, which combines one or more wrapper functions into a single higher-order component for subsequent use. For example, a StoreProvider function may be imported as follows:

```
import {StoreProvider} from '@directory/directory';
```

The return from the StoreProvider function is a wrapped root component that provides access external to the framework:

```
let WrappedRoot=
    StoreProvider([wrapperFunction1, wrapperFunction2],
       RootComponent);
```

Following this import, the state associated with any provided wrapperFunction may then be exported/used as desired.

As noted above, although subsequent use of the root component wrapped within a state container context may be subsequently made via calls from one of the application components 150, such calls may be made from anywhere within the web application, including outside the user interface framework 112. Because the container reference returns access to state variables and functions alongside a wrapper function that provides the stored state information, that stored state information may be viewed, adjusted, or otherwise managed from anywhere within the web application, irrespective of whether the calling code is within an inheriting portion of a tree within the framework 112, outside that portion of the tree, or entirely outside the framework 112. Additionally, because a separate wrapper function is provided for each component's state that is to be tracked, and all are exposed through wrapping of the root as noted above, a number of small state stores may be created and efficiently exposed, rather than using a monolithic state store which may not be applicable or efficient in all circumstances, and which is inaccessible outside the framework.

In a complete usage example in which a counter component is used, and which has a state that is desired to be exposed external to the framework 112, a counter component is defined in which counter state can be exported. As illustrated below, a setupStore function configures state storage and returns the container context, wrapper function, and container reference variables noted above, which are then mapped to component variables. The counter state is obtained from the local counter state storage within the component, and exported via StoreProvider to global state storage:

```
//counter.store.js
import React, {useState} from 'react';
import {setupStore} from '@directory/directory'; //state
   store of component setup
const useCounterContainer=( )=>{
   //perform counter operations
};
let [CounterContext, wrapCounter, counterRef]=set-
   upStore(useCounterContainer);
export {CounterContext, wrapCounter};
export default counterRef;
//counter.js
import React, {useContext} from 'react';
import {CounterContext} from './counter.store'; //obtain
   internal counter state
export default ( )=>{
   const [counterContext]=useContext(CounterContext);
      //update state store
   //set counter button operations
};
//index.js Root Component
import {StoreProvider} from '@directory/directory';
   //obtains state information
import {wrapCounter} from './counter.store';
import Counter from './counter';
export default StoreProvider([wrapCounter], Counter);
   //expose component state information globally
```

As can be seen in the above, the counter context drawn from the component may be stored in the external store, and the state store may then be provided externally from the counter component on a global basis.

In additional examples of use of global state information, a user account record may be updated by a user, and that record update may be reflected in a user interface without requiring the service to pass the change in state back to the respective UI components explicitly. Additionally, one store or container can watch state changes from another store, and this may result in data refresh elsewhere in the application (or in another application altogether). Additional example applications are described above, in conjunction with the user interface element discussion of FIGS. 2-3.

In addition to global state availability, it is noted that in some instances, state information may be desirable to be retained between application sessions, or otherwise in circumstances where the component is to be reused or its state is to be refreshed to a particular past state. For example, in a subsequent application session, it may be desirable to load a state from a past usage session so the application can remember, for example, user selections or component state selections (e.g., the defined zip code or retail location selections of the application user interface of FIG. 2). In this context, FIG. 7 illustrates a logical diagram of interactions between a front-end user interface component management framework 112 and an example library 500 in which state information may be persisted globally. In the example shown, the web that application may call a persisted state configuration function 506 using an initial state value and a key value. The persisted state configuration function may be used to set a key value pair in storage for persisting component state information. A persisted state function 508 may then be imported and called, for example using an initial value to use for the state and a persistence key (i.e.,m a key to be passed to the configured function to store the value). The persisted state function 508 may return, for example, a state value, and update function, and a state load indicator. The state value and related update function and state load indicator may be managed using a state data store 510 associated with the state access library 500, for example in a persistence layer.

In some examples, the persisted state function may be imported prior to use, similarly to the above. For example, an import function may be performed such as:

```
import {configureUsePersistedState} from '@directory/
   directory';
```

Additionally, key values are obtained (in the getItem code below) and assigned (in the setItem code) for the component state as follows:

```
async function getItem (key) {
   let value=perform async actions to return the value for
      the key return value;
}
async function setItem (key, value) {
   perform async actions to store the value in storage
      based on the provided key
}
```

```
//assign key-value pair to persisted state
configureUsePersistedState ({getItem, setItem});
```

Accordingly, key-value pairs may be utilized for storage of specific state values that may later be retrieved, e.g., when components are reset to a desired state and/or rehydrated for use. In such instances, a hook, usePersistedState may be subsequently imported and, when called, a retrieved key-value pair may be assigned to a particular component from the state data store 510:

```
import {usePersistedState} from '@directory/directory';
const [stateValue, setStateValue, isHydrated]=usePersistedState(initialValue, persistenceKey);
```

In this context, the parameters associated with the hook usePersistedState can include, e.g., an initial value, a persistence key, a state value, a function to update the state value, and a Boolean value indicating if the persisted value has been loaded into state. In this context, the initial value is used for a first initialization, and will subsequently be overridden by any persisted state that is rehydrated on mount. The persistence key is a key passed to the setItem function to store the value in the persistence layer. The function to update the state value is generally similar to "useState" in React, but also asynchronously calls a setItem function to allow a user to store the latest state in the persistence layer using a supplied persistenceKey. Finally, because persisted state is an asynchronous operation, the Boolean value allows the system to determine if the persisted value has been loaded into the state of the relevant component. Because reading and writing values to the persistence layer is performed asynchronously, certain actions might need to be delayed until after the persisted state has been rehydrated into state during a current application session. For example, a user's persisted, but expired, authentication token may need to be rehydrated into a particular component's state.

Referring to FIGS. 5-7 generally, it is noted that the hooks used for globally exposing state information, as well as persisting state information, may be used either alone or in combination. As such, the library discussed herein that provide such hooks provides a great deal of flexibility to expose and preserve state information from components within a front-end user interface management framework that would not otherwise be available or accessible. Additionally, these features are provided in the same language and constructs used by the front-end user interface management framework, simplifying development efforts.

Still further, because each exposed state from a component is stored using a wrapper function that exposes that state outside the framework, the state storage can be implemented using a number of small state storage locations which may be more easily and flexibly managed than a monolithic state storage solution.

Figure 8:
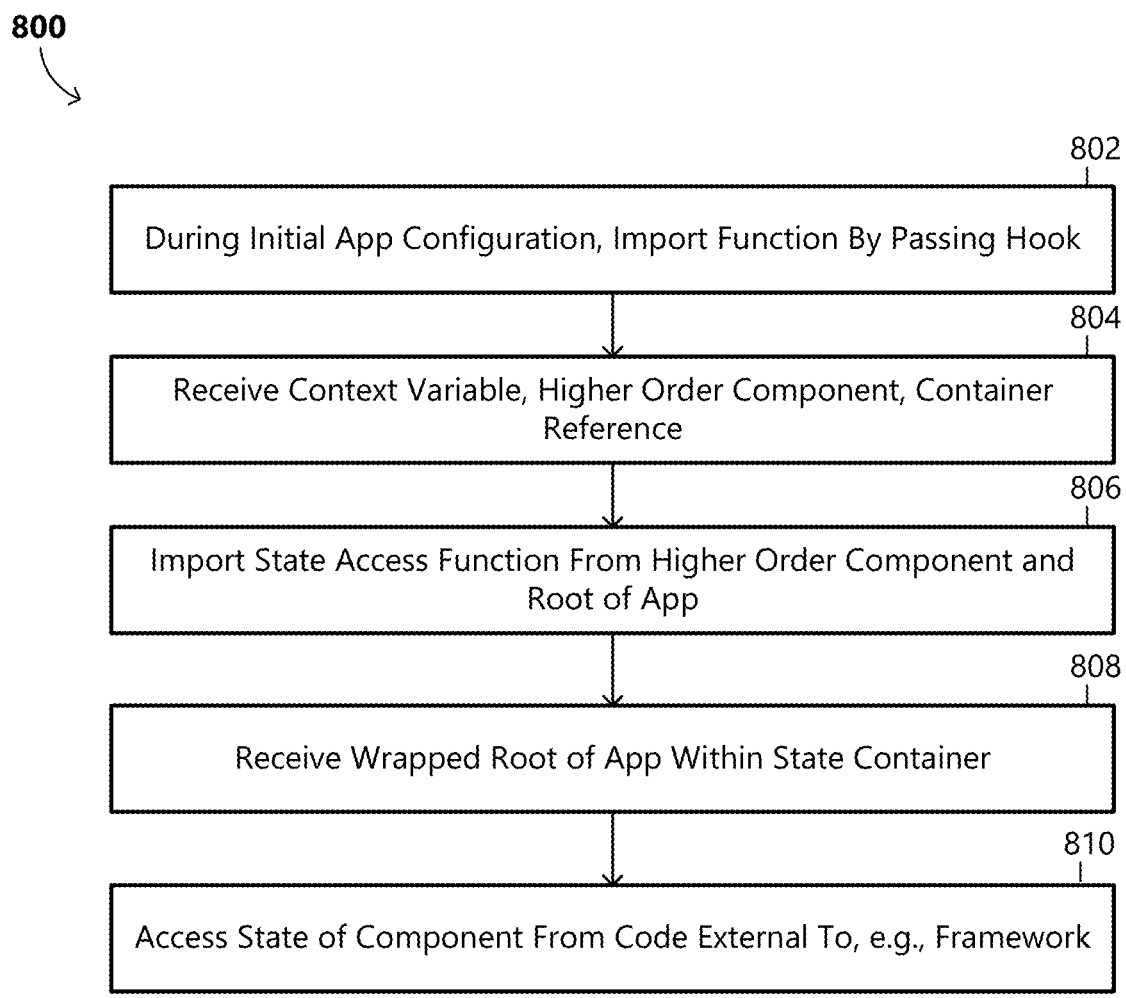
FIG. 8 illustrates a flowchart of an example method of performing global state management in accordance with example embodiments of the present disclosure.

Referring now to FIG. 8, a flowchart of an example method 800 of managing state information using the library discussed herein is provided in an example embodiment of the present disclosure. In the example shown, a method of using both globally-exposed state information is provided.

In the example shown, the method 800 includes, during initial application configuration of a web application, importing a function from a library to provide state information access globally (step 802). In example embodiments, the function can represent a state return function, and can receive, as an argument, a custom hook. The state information, as discussed herein, represents state information of a component that is managed via a front-end user interface component management framework.

When called, the state return function can return a context variable, a higher order component, and an object providing a container reference (step 804). The context variably provides access to the state and functions needed to operate on the state of the container. The higher order component provides access to the state information storage to the web application. The container reference provides access to state variables and functions.

A state access function may then be imported by providing information from the higher order component and a root of the web application (step 806). In response, a wrapped root of the application is returned, within a state container context (step 808).

In some embodiments, the state access function is provided with a number of higher order functions, or wrapper functions, such that the wrapped root of the application may provide access to state associated with each of the components associated with those wrapper functions. Accordingly, a subsequent access of a state component may be made from code external to the component, and in some instances external to the front-end user interface component management framework, may be provided (step 810). This access may be an explicit access of state information, or may be based on subscription to changes in state of particular components within the web application.

In accordance with the method seen in FIG. 8, it is noted that any application component may, using exposed state information, be able to subscribe to changes in state anywhere within a tree structure of components managed via the front-end user interface component management framework. Accordingly, improved flexibility with respect to modification of application components, refresh of data, or other features can be provided in a way that is not constrained by the framework's tree hierarchy and state access rights. Accordingly, changes in overall web application architecture may be made, since logic components may be defined that are abstracted from underlying user interface features, but which are still sensitive to state of those user interface features, and can subscribe to changes in state of those user interface features.

Figure 9:
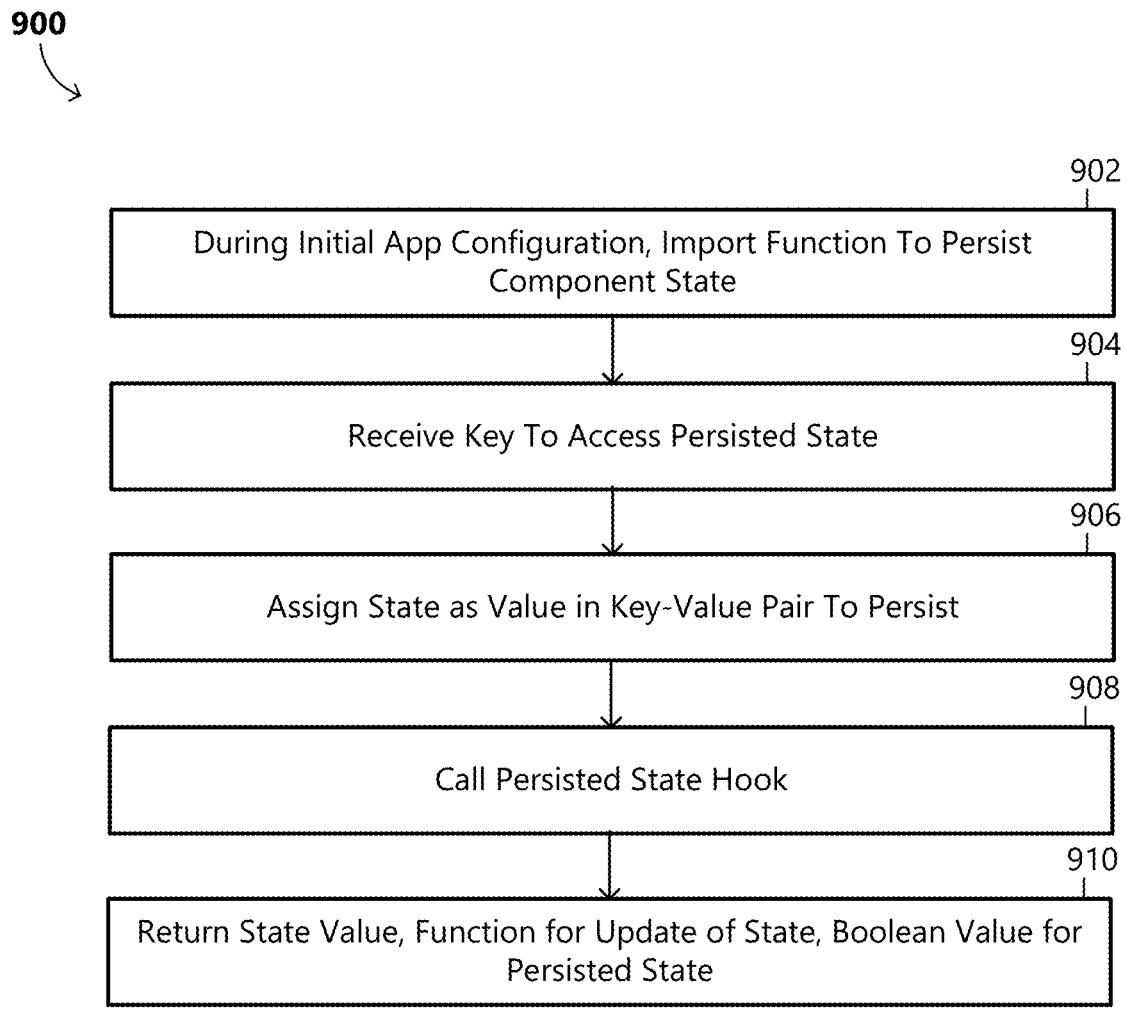
FIG. 9 illustrates a flowchart of an example method of persisting state information in accordance with example embodiments of the present disclosure.

Referring to FIG. 9, a further method 900 is disclosed in which state information may be persisted, for example between use sessions of a web application, or between usages of a particular component. The method 900 may be used either alone or in combination with the method 800 described above for global state access, as both may be provided in a common library.

In the example shown, the method 900 includes, during initial application configuration, importing a function to persist a component state (step 902). This may include, for example, importing a configuration function for using persisted state from a library. The method further includes receiving a key to access a persisted state (step 904), and assigning a value to a key-value pair in a state storage (e.g., storage 510 of FIG. 5) (step 906).

In the example shown, the method 900 further includes importing a persisted state function (step 908), and calling the persisted state function by providing it with an initial value and a key value for the state information to be accessed (step 910). Subsequently, the state value may be used as desired by the calling component or code, and/or the functions for updating state of the component having its state persisted may be called. Other operations are possible as well.

Figure 10:
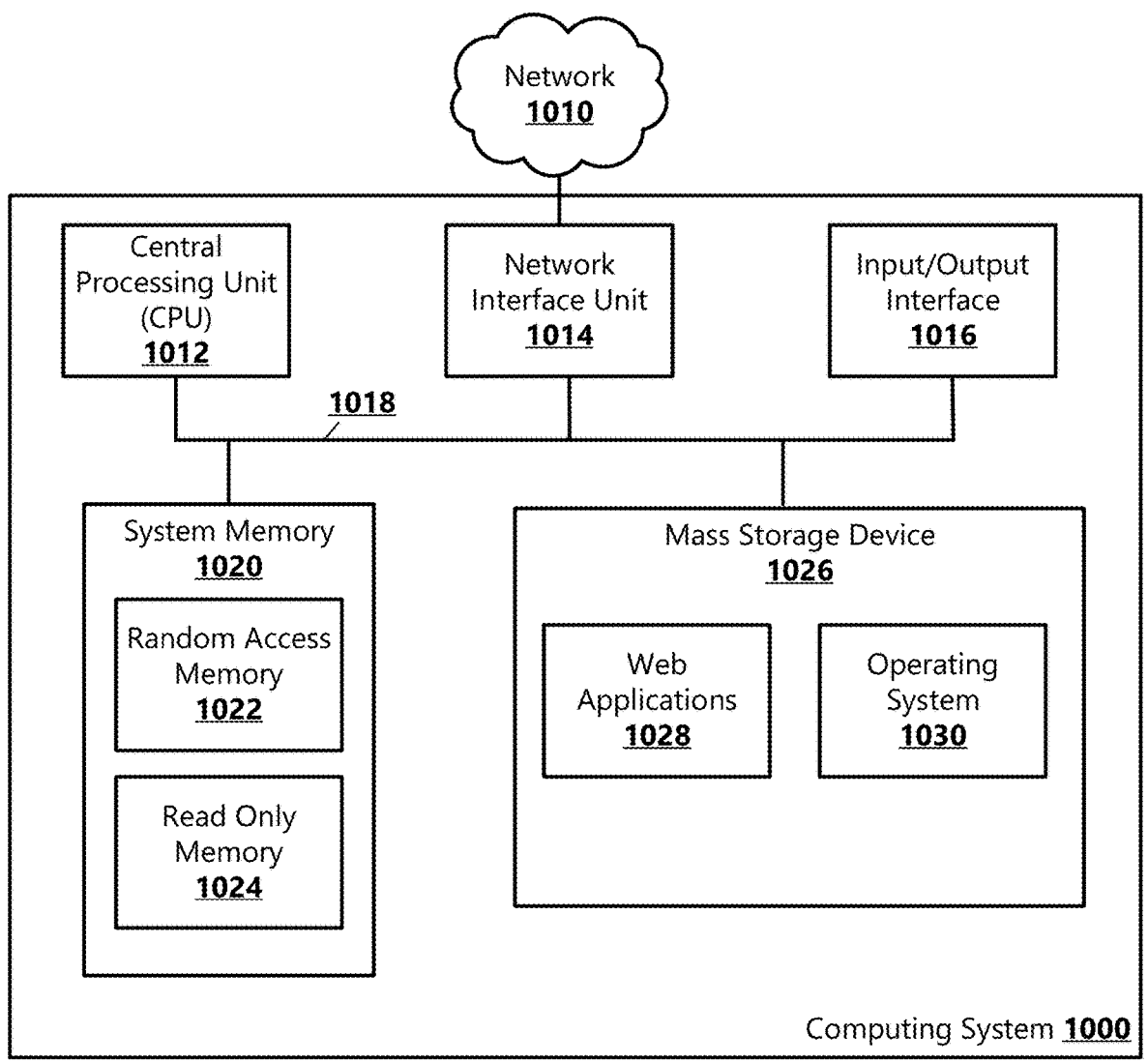
FIG. 10 is a block diagram of an example computing system with which aspects of the present disclosure may be implemented.

FIG. 10 is a block diagram of an example computing system with which aspects of the present disclosure may be implemented. In the embodiment shown, the computing system 1000 includes at least one central processing unit ("CPU") 1012, a system memory 1020, and a system bus 1018 that couples the system memory 1020 to the CPU 1012. The system memory 1020 includes a random access memory ("RAM") 1022 and a read-only memory ("ROM") 1024. A basic input/output system that contains the basic routines that help to transfer information between elements within the computing system 1000, such as during startup, is stored in the ROM 1024. The computing system 1000 further includes a mass storage device 1026. The mass storage device 1026 is able to store software instructions and data.

The mass storage device 1026 is connected to the CPU 1012 through a mass storage controller (not shown) connected to the system bus 1018. The mass storage device 1026 and its associated computer-readable storage media provide non-volatile, non-transitory data storage for the computing system 1000. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 1012 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 1000.

According to various embodiments of the invention, the computing system 1000 may operate in a networked environment using logical connections to remote network devices through a network 1010, such as a wireless network, the Internet, or another type of network. The computing system 1000 may connect to the network 1010 through a network interface unit 1014 connected to the system bus 1018. It should be appreciated that the network interface unit 1014 may also be utilized to connect to other types of networks and remote computing systems. The computing system 1000 also includes an input/output controller 1016 for receiving and processing input from a number of other devices, including a touch user interface display screen, or another type of input device. Similarly, the input/output controller 1016 may provide output to a touch user interface display screen or other type of output device.

As mentioned briefly above, the mass storage device 1026 and the RAM 1022 of the computing system 1000 can store software instructions and data. The software instructions include an operating system 1030 suitable for controlling the operation of the computing system 1000. The mass storage device 1026 and/or the RAM 1022 also store software instructions 1028, that when executed by the CPU 1012, cause the computing system 1000 to provide the functionality discussed in this document. For example, the mass storage device 1026 and/or the RAM 1022 can store software instructions that, when executed by the CPU 1012, cause the computing system 1000 to provide a library for state management within a front-end user interface component management framework.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of state storage structures, technologies disclosed herein are applicable to web technologies generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method comprising:
during initial configuration of a web application managed using a front-end user interface component management framework, importing a function from a library through which state information is accessible globally within an execution environment, wherein importing the function provides a hook to state information storage, the state information being descriptive of a state of a component within the front-end user interface component management framework;
receiving, upon calling the function:
a context variable providing access to the state and functions needed to operate on the state;
a higher order component that provides access to the state information storage to the web application; and
an object providing a container reference, the container reference providing access to state variables and functions;

importing a state access function by providing information from the higher order component and a root of the web application to the state access function; and receiving, in response to calling the state access function from code external to the component, the root of the web application wrapped within a state container context.

2. The method of claim 1, further comprising, accessing a state of the component from the code external to the component using the root of the web application wrapped within the state container context.

3. The method of claim 1, further comprising importing a persisted state function from the library.

4. The method of claim 3, wherein importing the persisted state function from the library occurs at a time the web application is launched.

5. The method of claim 3, further comprising receiving a value for a key used to access a persisted state.

6. The method of claim 5, further comprising calling a persisted state hook by providing an initial state value and the value for the key to the persisted state hook.

7. The method of claim 6, wherein the persisted state hook returns a state value, a function to update the state value, and a Boolean value indicating whether a persisted value has been loaded into the state value.

8. The method of claim 1, wherein the web application comprises at least one of a browser-based application or a mobile application.

9. The method of claim 1, wherein the web application comprises a plurality of discrete user interface elements, each of the plurality of discrete user interface elements being managed by a component within the front-end user interface component management framework.

10. The method of claim 1, wherein importing the state access function includes providing information from a plurality of higher order components to be included in the wrapped root of the web application returned by the state access function.

11. A system comprising:
a library called by a web application executed from a user computing device, the web application being managed using a front-end user interface component management framework, the web application including a plurality of components associated with user interface elements, wherein:
the library includes a function providing a hook to state information storage, and
the function returns:
a context variable providing access to the state and functions needed to operate on a state of a component from among the plurality of components;
a higher order component that provides access to the state information storage to the web application; and
an object providing a container reference, the container reference providing access to state variables and functions; and
wherein when called by a portion of the web application external to the component, a state access function included within the library returns a root of the web application wrapped within a state container context to allow access to the state of the component.

12. The system of claim 11, further comprising the web application, wherein the web application calls the library including the function and the state access function.

13. The system of claim 12, wherein the web application calls the library from a location external to the component.

14. The system of claim 12, wherein the library is integrated into the web application and hosted from a server system communicatively connected to a client device.

15. The system of claim 14, wherein the plurality of components are provided to the client device for execution.

16. The system of claim 12, wherein the library further includes a persisted state hook, the persisted state hook receiving an initial state value and a value for a key used to access a persisted state.

17. The system of claim 16, wherein the persisted state hook returns a state value, a function to update the state value, and a Boolean value indicating whether a persisted value has been loaded into the state value.

18. The system of claim 17, wherein the web application is configured to delay an action in response to determining that the persisted value has not been loaded into the state value.

19. A computer-implemented method of performing global state management useable in connection with a web application executed from a user computing device, the web application being managed using a front-end user interface component management framework, the method comprising:
during initial configuration of the web application, importing a function from a global state management library, wherein importing the function provides a hook to state information storage, the state information being descriptive of a state of a component within the front-end user interface component management framework;
receiving, in response to calling the function:
a context variable providing access to the state and functions needed to operate on the state;
a higher order component that provides access to the state information storage to the web application; and
an object providing a container reference, the container reference providing access to state variables and functions;
importing a state access function and providing information from the higher order component and a root of the web application to the state access function;
receiving, in response to the state access function, the root of the web application wrapped within a state container context; and
accessing a state of the component from the code external to the component using the root of the web application wrapped within the state container context.

20. The method of claim 19, further comprising:
receiving a value for a key used to access a persisted state; and
calling a persisted state hook from the library by providing an initial state value and the value for the key to the persisted state hook;
wherein the persisted state hook returns a state value, a function to update the state value, and a Boolean value indicating whether a persisted value has been loaded into the state value.

* * * * *